(12) United States Patent
Tsushima et al.

(10) Patent No.: US 9,373,926 B2
(45) Date of Patent: Jun. 21, 2016

(54) LASER CHAMBER AND DISCHARGE EXCITATION GAS LASER APPARATUS

(71) Applicant: GIGAPHOTON INC., Oyama-shi, Tochigi (JP)

(72) Inventors: Hiroaki Tsushima, Oyama (JP); Hakaru Mizoguchi, Oyama (JP); Junichi Fujimoto, Oyama (JP); Hiroaki Nakarai, Oyami (JP); Natsushi Suzuki, Oyami (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 14/694,743

(22) Filed: Apr. 23, 2015

(65) Prior Publication Data

US 2015/0249312 A1 Sep. 3, 2015

Related U.S. Application Data

(63) Continuation of application No. PCT/JP2013/079751, filed on Nov. 1, 2013.

(30) Foreign Application Priority Data

Nov. 5, 2012 (JP) .................................. 2012-243790

(51) Int. Cl.
*H01S 3/036* (2006.01)
*F16C 33/66* (2006.01)
(Continued)

(52) U.S. Cl.
CPC ............. *H01S 3/036* (2013.01); *F16C 32/0402* (2013.01); *F16C 32/0406* (2013.01); *F16C 33/6696* (2013.01); *H01S 3/038* (2013.01); *H01S 3/097* (2013.01); *H01S 3/104* (2013.01); *H01S 3/134* (2013.01); *H01S 3/2232* (2013.01); *H01S 3/2251* (2013.01); *H01S 3/2256* (2013.01); *F16C 19/06* (2013.01); *F16C 2204/02* (2013.01); *F16C 2204/10* (2013.01);
(Continued)

(58) Field of Classification Search
CPC ....... H01S 3/036; H01S 3/2232; H01S 3/038; H01S 3/097; H01S 3/2251; H01S 3/2256; F16C 32/0402; F16C 32/0406; F16C 33/6696; F16C 2204/02
See application file for complete search history.

(56) References Cited

U.S. PATENT DOCUMENTS 6,539,043 B1    3/2003    Shinozaki et al.
6,577,664 B1 *   6/2003    Nara ....................... F16C 39/02
                                                                 372/57

FOREIGN PATENT DOCUMENTS

JP            4155877 A      5/1992
JP       1993072158 U      9/1993
(Continued)

OTHER PUBLICATIONS

International Search Report dated Feb. 4, 2014 corresponds to PCT/JP2013/079751.

*Primary Examiner* — Dung Nguyen
(74) *Attorney, Agent, or Firm* — Studebaker & Brackett PC

(57) ABSTRACT

There is provided a laser chamber housing a pair of discharge electrodes and a gas circulation fun, the laser chamber including: a magnetic bearing configured to support a shaft of the gas circulation fan, with the shaft being in non-contact with the magnetic bearing; and a touchdown bearing configured to operate as a bearing when the magnetic bearing is uncontrollable, the touchdown bearing being provided with solid lubricant configured of one or more of an Au plating layer, a Ni-containing plating layer, and a Cu plating layer.

16 Claims, 11 Drawing Sheets

(51) Int. Cl.
    *F16C 32/04*     (2006.01)
    *H01S 3/134*     (2006.01)
    *H01S 3/225*     (2006.01)
    *H01S 3/038*     (2006.01)
    *H01S 3/097*     (2006.01)
    *H01S 3/223*     (2006.01)
    *H01S 3/104*     (2006.01)
    *F16C 19/06*     (2006.01)
    *H01S 3/0971*     (2006.01)
    *H01S 3/1055*     (2006.01)

(52) U.S. Cl.
    CPC ............ *F16C2204/52* (2013.01); *H01S 3/0971* (2013.01); *H01S 3/1055* (2013.01); *H01S 3/225* (2013.01)

(56) References Cited

FOREIGN PATENT DOCUMENTS

| | | |
|---|---|---|
| JP | 1994275902 A | 9/1994 |
| JP | 1996303453 A | 11/1996 |
| JP | 1998103362 A | 4/1998 |
| JP | 1998270779 A | 10/1998 |
| JP | 2000183436 A | 6/2000 |
| JP | 2001044533 A | 2/2001 |
| JP | 2002168252 A | 6/2002 |
| JP | 2003013622 A | 1/2003 |
| JP | 2012059797 A | 3/2012 |
| WO | 0033431 A1 | 6/2000 |

\* cited by examiner

LASER CHAMBER AND DISCHARGE EXCITATION GAS LASER APPARATUS

TECHNICAL FIELD

The disclosure relates to a laser chamber and a discharge excitation gas laser apparatus.

BACKGROUND ART

With miniaturization and high integration of a semiconductor integrated circuit, improvement of resolution is demanded in a semiconductor exposure apparatus (hereinafter, referred to as an "exposure apparatus"). Accordingly, shortening of a wavelength of light emitted from a light source for exposure is proceeding. In recent years, a gas laser apparatus is used for the light source for exposure in place of an existing mercury lamp. Currently, as a gas laser apparatus for exposure, a KrF excimer laser apparatus that emits deep ultraviolet rays of a wavelength of 248 nm and an ArF excimer laser apparatus that emits vacuum ultraviolet rays of a wavelength of 193 nm are used.

As a next-generation exposure technology, liquid immersion exposure is also performed in which liquid is filled between an exposure lens on an exposure apparatus side and a wafer and a refractive index is changed to shorten an apparent wavelength of the light source for exposure. In the liquid immersion exposure using the ArF excimer laser apparatus as the light source for exposure, vacuum ultraviolet rays of a wavelength equivalent to a wavelength of 134 nm in water is applied to the wafer. This technology is called ArF liquid immersion exposure (or ArF liquid immersion lithography).

Since a spectrum line width of natural oscillation of the KrF and ArF excimer laser apparatuses is wide, about 350 pm to about 400 pm, color aberration occurs and resolution is decreased when these projection lenses are used. Therefore, it is necessary to narrow the spectrum line width of a laser beam emitted from the gas laser apparatus until the color aberration becomes ignorable. Accordingly, a line narrowing module including a line narrowing device (such as an etalon and a grating) is provided in a laser resonator of the gas laser apparatus, which achieves narrowing of the spectrum line width. The laser apparatus narrowed in the spectrum line width in this way is called a line narrowing laser apparatus.

CITATION LIST

Patent Literature

PTL 1: Japanese Unexamined Patent Application Publication No. 2000-183436
PTL 2: Japanese Unexamined Patent Application Publication No. 2002-168252

SUMMARY

According to an embodiment of the disclosure, there may be provided a laser chamber housing a pair of discharge electrodes and a gas circulation fan, the laser chamber including: a magnetic bearing configured to support a shaft of the gas circulation fan, with the shaft being in non-contact with the magnetic bearing; and a touchdown bearing configured to operate as a bearing when the magnetic bearing is uncontrollable, the touchdown bearing being provided with solid lubricant configured of one or more of an Au plating layer, a Ni-containing plating layer, and a Cu plating layer.

According to an embodiment of the disclosure, there may be provided a discharge excitation gas laser apparatus including the above-described laser chamber and a laser controller that is configured to control generation of laser light in the above-described laser chamber.

According to an embodiment of the disclosure, there may be provided a laser chamber including: a pair of electrodes; a fan configured to circulate laser gas; a magnetic bearing configured to magnetically support a shaft of the fan, with the shaft being in non-contact with the magnetic bearing; a touchdown bearing configured to support the shaft of the fan when the magnetic bearing fails; an inlet port configured to supply purge gas to the touchdown bearing; and an exhaust port configured to exhaust the purge gas.

According to an embodiment of the disclosure, there may be provided a discharge excitation gas laser apparatus including the above-described laser chamber and a laser controller that is configured to control generation of laser light in the above-described laser chamber.

BRIEF DESCRIPTION OF DRAWINGS

Some embodiments of the disclosure will be described as an example below with reference to the accompanying drawings.

EMBODIMENTS

Figure 1:
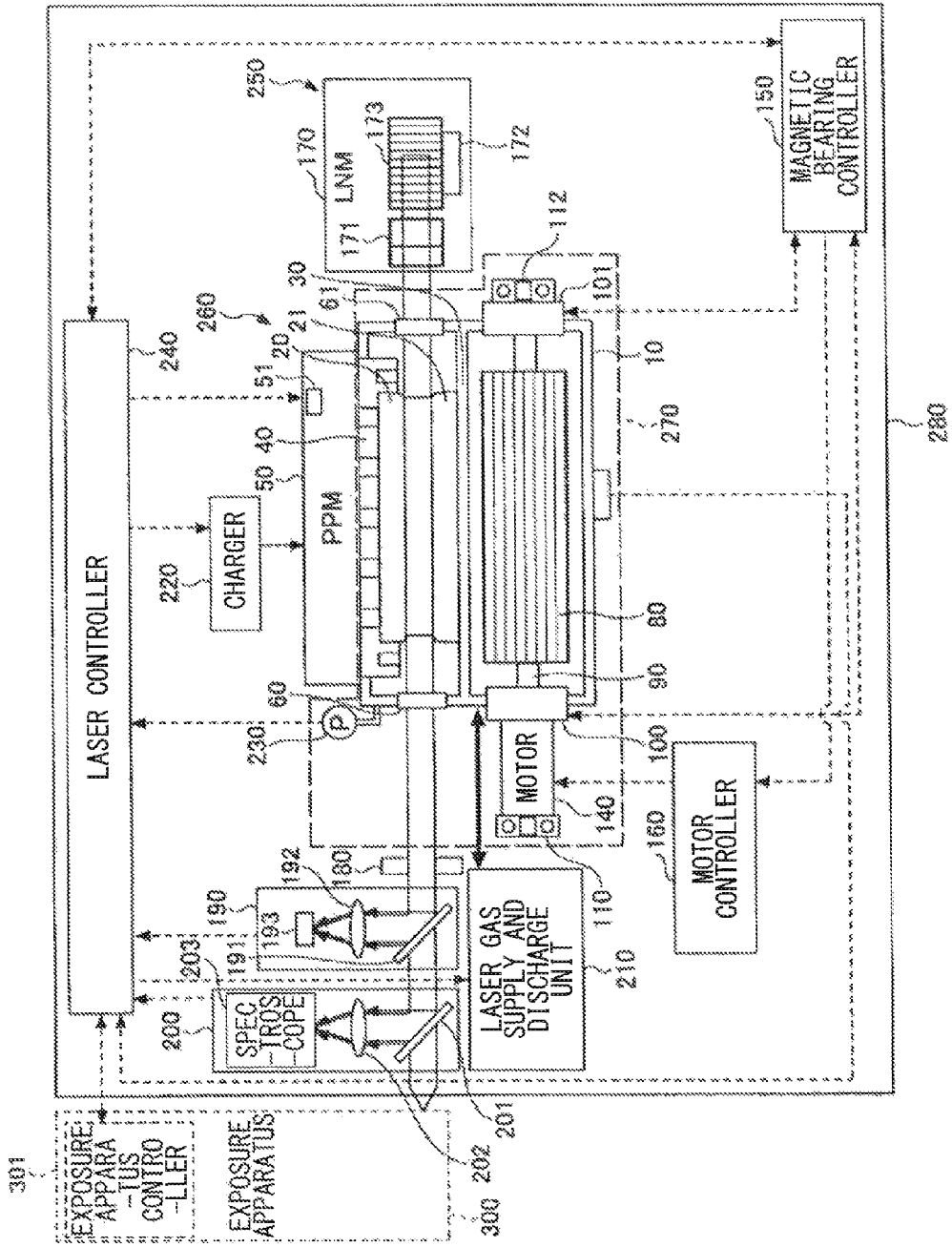
FIG. 1 is a diagram illustrating an example of an excimer laser apparatus according to an embodiment.

Hereinafter, embodiments of the disclosure will be described along the following flow of contents.

Contents
1. Outline
2. Description of Terms
3. Excimer Laser Apparatus
   3.1 Configuration
   3.2 Operation 4. Touchdown Bearing Provided in Laser Chamber of Excimer Laser Apparatus
   4.1 Embodiment 1
   4.2 Embodiment 2
5. Laser Chamber of Excimer Laser Apparatus
   5.1 Embodiment 3
   5.2 Embodiment 4

In the following, some embodiments of the disclosure are described in detail with reference to the drawings. Embodiments described below each illustrate one example of the disclosure and are not intended to limit the contents of the disclosure. Also, all of the configurations and operations described in each embodiment are not necessarily essential for the configurations and operations of the disclosure. Note that like elements are denoted with the same reference numerals, and any redundant description thereof is omitted.

1. Outline

A magnetic bearing is used as a bearing of a cross flow fan contained in a laser chamber of an excimer laser apparatus. The magnetic bearing prevents breakage caused by contact between a rotor and a stator at the time when power of the magnetic bearing is down or when an error occurs, and therefore the magnetic bearing may be provided together with a touchdown bearing.

In the excimer laser apparatus, fluorine gas ($F_2$) is used in the laser chamber. Therefore, when the touchdown bearing is formed of stainless steel or the like possessing low resistance to fluorine, the touchdown bearing may be corroded and further the touchdown bearing may be consumed to be unrotatable.

Therefore, in the laser chamber and a discharge excitation laser apparatus according to the embodiments of the disclosure, an Au plating layer, a Ni-containing metal (Ni, NiP, or NiB) plating layer, or a Cu plating layer may be used as a solid lubricant of the touchdown bearing. These plating layers make it possible to suppress corrosion of the touchdown bearing because of possessing resistance to fluorine gas. Further, these plating layers may suppress consumption of the touchdown bearing in a case where the touchdown bearing is partially formed of stainless steel (SUS), because these plating layers are soft as compared with stainless steel.

Moreover, when one or both of corrosion and consumption of the touchdown bearing occur, it may be necessary to disassemble the magnetic bearing parts and to replace the touchdown bearing at the time of periodic maintenance of the laser chamber.

In the laser chamber according to the embodiment of the disclosure, using one or more of the Au plating layer, the Ni-containing metal (Ni, NiP, or NiB) plating layer, and the Cu plating layer may suppress corrosion of the touchdown bearing. In the discharge excitation laser apparatus according to the embodiment of the disclosure, using one or more of the Au plating layer, the Ni-containing metal (Ni, NiP, or NiB) plating layer, and the Cu plating layer may suppress corrosion of the touchdown bearing. Therefore, it may be unnecessary to disassemble the magnetic bearing parts and to replace the touchdown bearing in periodic maintenance of the laser chamber. As a result, the number of operation steps in the periodic maintenance of the laser chamber may be reduced.

Further, the laser chamber according to the embodiment of the disclosure may include an inlet port that is so configured as to supply purge gas to the touchdown bearing and an exhaust port that is so configured as to exhaust the purge gas. The discharge excitation laser apparatus according to the embodiment of the disclosure may include an inlet port that is so configured as to supply purge gas to the touchdown bearing and an exhaust port that is so configured as to exhaust the purge gas. Accordingly, it is possible to allow the purge gas to flow through the touchdown bearing. This makes it possible to eliminate dust that is generated by corrosion of the touchdown bearing and causes lock of the touchdown bearing, from the touchdown bearing. Therefore, occurrence of lock of the touchdown bearing caused by the dust may be suppressed. As a result, it is possible to reduce frequency of disassembly of the magnetic bearing parts and frequency of replacement of the touchdown bearing.

2. Description of Terms

Terms used in the disclosure are defined as follows.

"Discharge excitation gas laser apparatus" is a laser apparatus that generates electric discharge in the laser chamber to provide excitation energy to laser gas that is sealed in the laser chamber and generates laser light, and examples thereof may include an excimer laser apparatus, a $CO_2$ laser apparatus, and an $F_2$ laser apparatus.

"Radial direction" means a radial direction of a rotation body.

"Magnetic bearing" means a driving mechanism of the rotation body that includes an actuator on a stator side and a motor. The actuator magnetically floats the rotor, and the motor rotates the rotor.

"Touchdown bearing" means an auxiliary bearing that suppresses breakage caused by contact between the rotor and the stator when the magnetic bearing is uncontrollable.

3. Excimer Laser Apparatus

3.1 Configuration

FIG. 1 is a diagram illustrating an example of an excimer laser apparatus according to the present embodiment. Note that the excimer laser apparatus is also a kind of the discharge excitation gas laser apparatus. The excimer laser may be used as a light source of an exposure apparatus 300, and may output generated laser light to the exposure apparatus 300. Note that the exposure apparatus 300 may include an exposure apparatus controller 301, and may be so configured as to mutually communicate with a laser controller 240 of the excimer laser apparatus to execute output instruction of the laser light from the excimer apparatus.

The excimer laser apparatus may include the laser controller 240, a laser resonator 250, and a laser gas supply and discharge unit 210.

Moreover, a laser oscillation system 260 may include a laser chamber 10, the laser resonator 250, an energy detector 190, a charger 220, a pulse power module (PPM) 50, and a spectrum detector 200.

Further, the laser chamber 10 may include a pair of discharge electrodes 20 and 21, and two windows 60 and 61 that allow light of the laser resonator 250 to pass therethrough. The laser chamber 10 may be disposed in an optical path of the laser resonator 250.

The laser chamber 10 may further include a cross flow fan 80, a shaft 90, magnetic bearings 100 and 101, touchdown bearings 110 and 112, a motor 140, a magnetic bearing controller 150, a motor controller 160, and an electric insulating section 40. One radial magnetic bearing may be provided in each of the magnetic bearings 100 and 101. Moreover, the touchdown bearings 110 and 112 may be provided on outer sides of the magnetic bearings 100 and 101, respectively. Note that the cross flow fan 80 and a part of the shaft 90 may be contained in the laser chamber 10, and apart of the shaft 90, the magnetic bearings 100 and 101, and the touchdown bearings 110 and 112 may be attached to side walls of the laser chamber 10.

The laser resonator 250 may include an output coupler (OC) 180 and a line narrowing module (LNM) 170. The line narrowing module 170 may include a prism 171 magnifying a beam, a rotation stage 172, and a grating 173. The grating 173 may be disposed in Littrow arrangement such that an incident angle and a diffraction angle become the same angle. The grating 173 may be disposed on the rotation stage 172 such that an incident angle of the laser light to the grating 173 may be varied. Here, the output coupler (OC) 180 may be a partial reflection mirror that reflects part of laser light and allows part of light to pass therethrough.

The pulse energy detector 190 may include a beam splitter 191, a condenser lens 192, and an optical sensor 193 that may be arranged in an optical path of the laser light output from the output coupler (OC) 180.

The spectrum detector 200 may include a beam splitter 201, a condenser lens 202, and a spectroscope 203 that may be arranged in the optical path of the laser light output from the output couple (OC) 180. The spectroscope 203 may include, for example, a diffuser plate, an air gap etalon, a condenser lens, and a line sensor that are not illustrated.

The pulse power module (PPM) 50 may include a charging capacitor not illustrated, and may include a switch 51 that may be connected to the discharge electrodes 20 and 21 and causes discharge between the discharge electrodes 20 and 21.

The charger 220 may be connected to the unillustrated charging capacitor in the pulse power module (PPM) 50.

A pressure sensor 230 is a sensor to measure laser gas pressure in the laser chamber 10. The laser gas pressure measured by the pressure sensor 230 may be transmitted to the laser controller 240.

The laser chamber 10 is filled with laser gas. The laser gas may be Ar or Kr as rare gas, $F_2$ gas as halogen gas, Ne or He as buffer gas, or mixed gas containing at least $F_2$ gas.

The laser gas supply and discharge unit may include a valve and a flow control valve that are not illustrated. The unit may be connected to a not-illustrated gas cylinder containing the laser gas, and may include a valve and a discharge pump that are not illustrated.

The excimer laser apparatus may output the laser light to the exposure apparatus 300.

Figure 2:
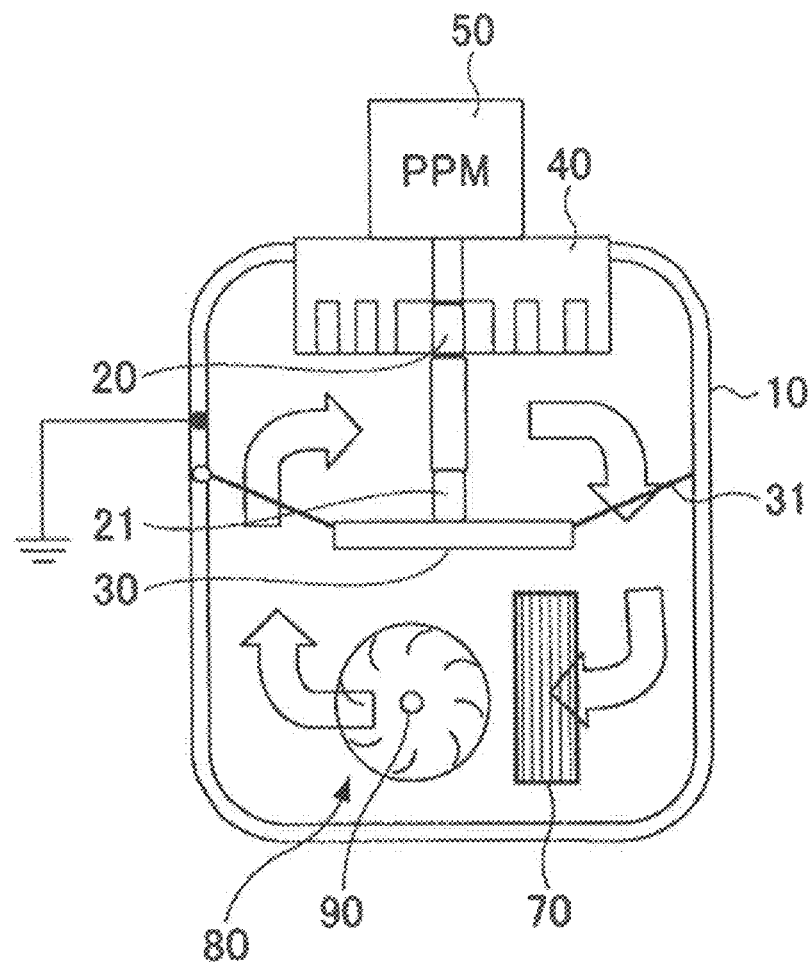
FIG. 2 is a diagram illustrating an example of a sectional configuration of a laser chamber according to the embodiment.

FIG. 2 is a diagram illustrating an example of a sectional configuration of the laser chamber 10 according to the present embodiment. As illustrated in FIG. 2, a heat exchanger 70 may be disposed at the inside of the laser chamber 10. Moreover, the electrode 20 on upper side may be connected and supported by a high-voltage output section of the PPM 50 with the electric insulating section 40 in between, and the electrode 21 on lower side may be so supported by an electrode holder 30 from below as to face the electrode 20 and may be electrically connected to a metal part of the laser chamber 10 by a wiring 31. The metal part of the laser chamber 10 may be connected to the ground.

In addition, as illustrated in FIG. 2, the laser gas in the laser chamber 10 may circulate in the laser chamber 10 by rotation of the cross flow fan 80. Note that the laser gas circulating in the laser chamber 10 may be cooled by the heat exchanger 70 while circulating.

3.2 Operation

Next, operation of the excimer laser apparatus will be described with reference to FIG. 1 and FIG. 2.

When receiving instruction of oscillation preparation of the laser apparatus from the exposure apparatus controller 301, the laser controller 240 may control supply of the laser gas and the arranged units. The laser controller 240 may supply laser gas of a predetermined composition into the laser chamber until the inside of the laser chamber 10 become a predetermined pressure.

The laser controller 240 may transmit, to the magnetic bearing controller 150, signals that magnetically floats the cross flow fan 80 and the shaft 90 and rotates the motor 140. The magnetic bearing controller 150 may magnetically float the shaft 90 of the cross flow fan 80 and may control the cross flow fan 80 to rotate at a predetermined rotating speed through the motor controller 160.

The laser controller 240 may receive target pulse energy Et and an oscillation trigger from the exposure apparatus controller 301. The laser controller 240 may set a predetermined charging voltage (Vhv) to the charger 220 such that laser light to be output becomes the target pulse energy Et. Then, the laser controller 240 may operate the switch 51 in the pulse power module (PPM) 50 in synchronization with the oscillation trigger, and may apply a high voltage between the electrodes 20 and 21.

As a result, electric discharge may occur between the electrodes 20 and 21, laser gas may be excited, and laser oscillation may occur in the laser resonator 250 that includes the output coupler (OC) 180 and the grating 173. At this time, laser light narrowed in line width by the prism 171 and the grating 173 may be output from the output coupler (OC) 180.

The laser light output from the output coupler (OC) 180 may partially enter the pulse energy detector 190, the laser light that has partially entered the pulse energy detector 190 may be partially reflected by the beam splitter 191, and the pulse energy of the laser light that has partially reflected by the beam splitter 191 may be detected through the lens 192. The light that has passed through the beam splitter 191 may enter the exposure apparatus 300. In this way, pulse energy E of the laser light output from the output coupler (OC) may be detected by the pulse energy detector 190.

The laser controller 240 may store therein one or both of the charging voltage Vhv at this time and the output pulse energy E. Moreover, the laser controller 240 may perform feedback control of the charging voltage Vhv such that the pulse energy E of the output laser light becomes the target pulse energy Et, based on difference ΔE between the target pulse energy Et and the actual output energy E.

When the charging voltage Vhv becomes higher than a maximum value of the acceptable range, the laser controller 240 may control the laser gas supply and discharge unit 210 to supply the laser gas into the laser chamber 10 until the pressure becomes a predetermined pressure. In addition, when the charging voltage Vhv becomes lower than a minimum value of the acceptable range, the laser controller 240 may control the laser gas supply and discharge unit 210 to discharge the laser gas from the laser chamber 10 until the pressure becomes a predetermined pressure.

Part of the laser light output from the output coupler (OC) 180 may be sampled by the beam splitter 201, and the sampled part of the laser light may be allowed to enter the spectroscope 203. A center wavelength of the laser light may be measured by the spectroscope 203.

The laser controller 240 controls the rotation stage 172 of the line narrowing module (LNM) 170 based on the difference Δλ between the wavelength measured by a spectrum measuring instrument and the target wavelength so that the incident angle of the laser light to the grating 173 may be changed. As a result, the wavelength of the laser light may be controlled by the change of the selected wavelength of the grating 173.

The excimer laser apparatus is not necessarily a line narrowing laser apparatus, and may be an excimer laser apparatus outputting natural oscillation light. For example, a highly reflective mirror may be disposed instead of the line narrowing module (LNM) 170.

For example, with such operation, the excimer laser apparatus according to the present embodiment may output the laser light. In the excimer laser apparatus according to the present embodiment, the cross flow fan 80 and a part of the shaft 90 are contained in the laser chamber 10, and the magnetic bearings 100 and 101 that are driving sections of the cross flow fan 80 and the shaft 90 and the touchdown bearings 110 and 112 that are auxiliary bearings of the magnetic bearings 100 and 101 are attached and provided on the side walls of the laser chamber 10. However, since the shaft 90 and the magnetic bearings 100 and 101 include a clearance, the laser gas in the laser chamber 10 reaches the touchdown bearings 110 and 112. As described above, there may be a case where fluorine gas is used as the laser gas.

In this case, stainless steel (SUS) that possesses limited resistance to the fluorine gas may be used for the touchdown bearings 110 and 112, and accordingly durability of the touchdown bearings 110 and 112 may become an issue.

Therefore, in the excimer laser apparatus according to the present embodiment, the touchdown bearings 110 and 112 may be plated and covered with a metal material possessing high fluorine resistance to solve the issue. Hereinafter, configurations of the touchdown bearings 110 and 112 that are used in the laser chamber or the excimer laser apparatus according to the present embodiment will be described in more detail.

4. Touchdown Bearing Provided on Laser Chamber of Excimer Laser Apparatus

4.1 Embodiment 1

Figure 3:
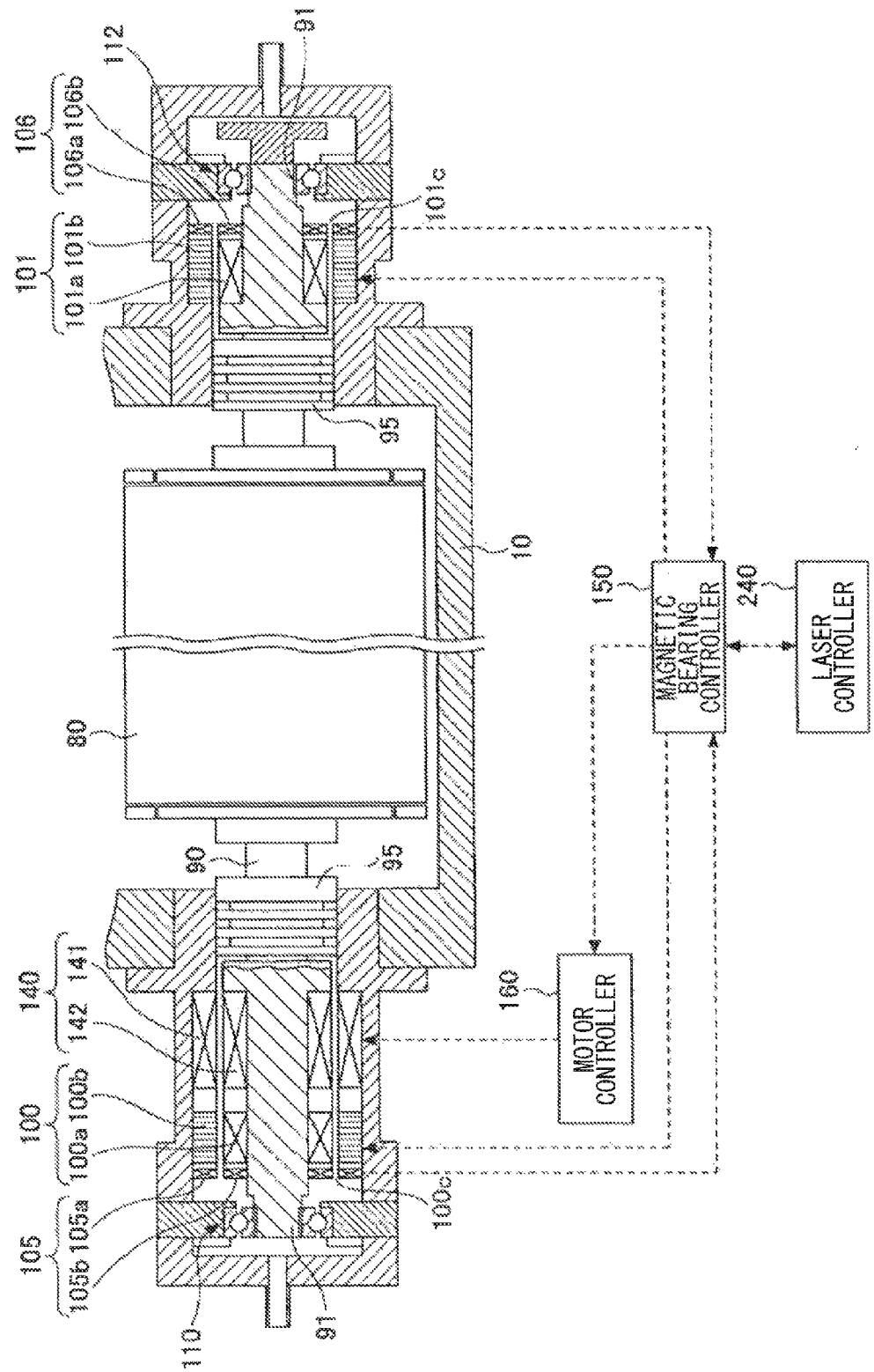
FIG. 3 is a diagram illustrating an example of a laser chamber according to embodiment 1 of the disclosure.

FIG. 3 is a diagram illustrating an example of a laser chamber according to embodiment 1 of the disclosure. The laser chamber 10 according to the embodiment 1 may include the cross flow fan 80, shafts 90 and 91, a labyrinth structure 95, the magnetic bearings 100 and 101, gap sensors 105 and 106, and the touchdown bearings 110 and 112. Note that the magnetic bearings 100 and 101 may include inner-ring magnetic bodies 100a and 101a, outer-ring electromagnetic coils 100b and 101b, and gaps 100c and 101c, respectively. Moreover, the motor 140 may include a stator 141 and a rotor 142. Further, the magnetic bearing controller 150, the motor controller 160, and the laser controller 240 may be provided on the outside of the laser chamber 10.

Here, the gap sensors 105 and 106 may be sensors to detect the gaps 100c and 101c of the magnetic bearings 100 and 101, respectively. The gap sensors 105 and 106 may include coils 105a and 106a and magnets 105b and 106b, respectively. When respective distances between the magnets 105b and 106b and the coils 105a and 106a are changed, back electromotive force occurs in the coils 105a and 106a by electromagnetic induction, and currents flow threrethrough. Then, the gaps 100c and 101c of the magnetic bearings 100 and 101 may be detected from the current values flowing through the coils 105a and 106a, respectively. Moreover, the magnetic bearings 100 and 101 may include the inner-ring magnetic bodies 100a and 101a and the outer-ring electromagnetic coils 100b and 101b, respectively. Controlling the current values of the outer-ring electromagnetic coils 100b and 101b makes it possible to control repulsive force generated between the inner-ring magnetic bodies 100a and 101a and the outer-ring electromagnetic coils 100b and 101b, and the outer-ring electromagnetic coils 100b and 101b may accordingly function as actuators to magnetically float the shaft 90. In addition, the magnetic bearing controller 150 controls magnetic floating force that is generated from the gaps 100c and 101c detected by the gap sensors 105 and 106, by the outer-ring electromagnetic coils 100b and 101b functioning as the actuators, and performs control of maintaining appropriate gaps 100c and 101c. The motor controller 160 performs control of appropriate rotation driving of the motor 140. Note that the laser controller 240 is the same as that described in FIG. 1, and the description thereof is accordingly omitted. Further, in FIG. 3, portions of the shaft 91 located in the touchdown bearings 110 and 112 are configured to be smaller in diameter than the shaft 90.

As illustrated in FIG. 3, the labyrinth structure 95 is provided in the motor 140, the magnetic bearings 100 and 101, and the laser chamber 10; however, sufficient shielding of the laser gas by the labyrinth structure 95 is difficult, and therefore, the laser gas reaches the motor 140 and the magnetic bearing 100 through the labyrinth structure 95. The motor 140 includes a gap between the stator 141 and the rotor 142 and the magnetic bearings 100 and 101 also include the gaps 100c and 101c between the inner-ring magnetic bodies 100a and 101a and the outer-ring electromagnetic coils 100b and 101b, respectively. Accordingly, the laser gas that has passed through the labyrinth structure 95 may reach the touchdown bearings 110 and 112 that are provided on the outer side.

In the laser chamber 10 according to the present embodiment, however, an Au plating layer, a Ni-containing plating layer, or a Cu plating layer may be formed as a solid lubricant on a surface of each of the inner ring and the outer ring of the touchdown bearing to cover the surface of each of the inner ring and the outer ring.

Figure 4:
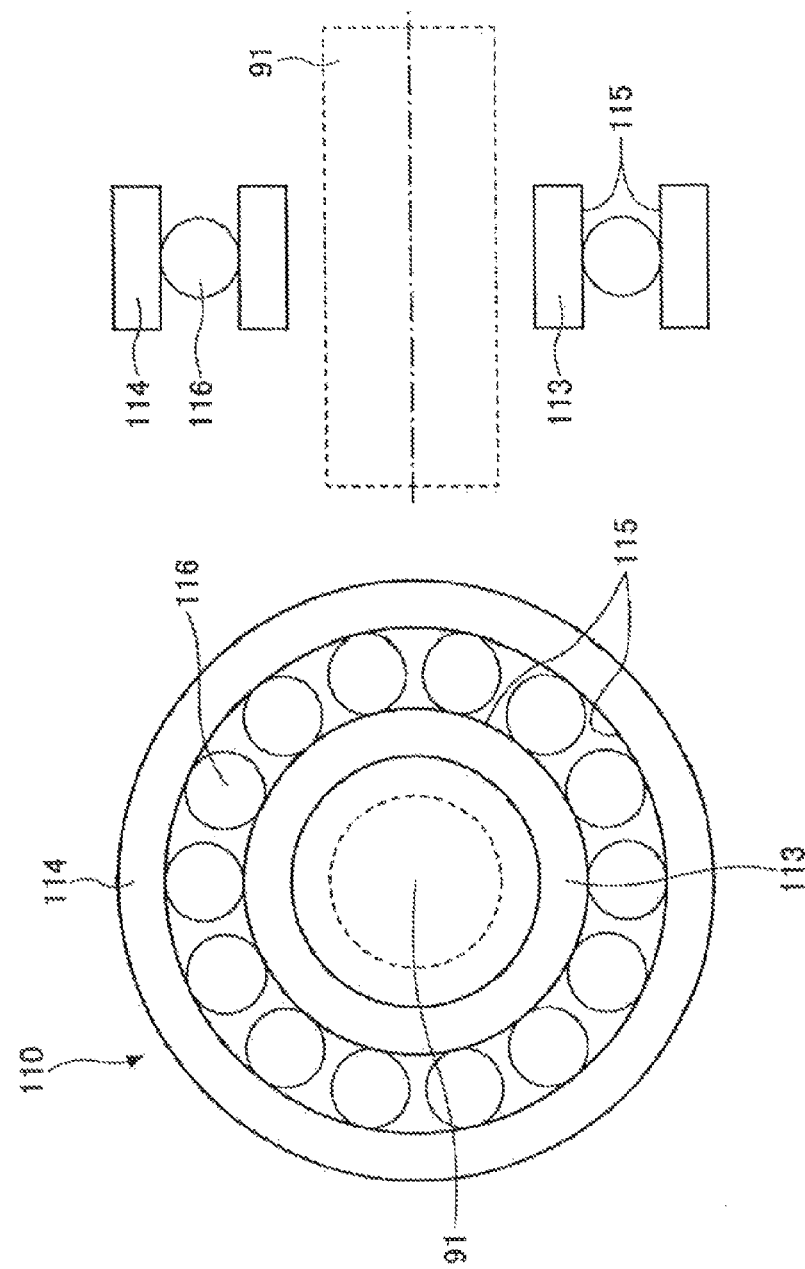
FIG. 4 is a diagram illustrating an example of a sectional configuration of a touchdown bearing of the laser chamber according to the embodiment.

FIG. 4 is a diagram illustrating an example of a sectional configuration of the touchdown bearing 110 of the laser chamber according to the present embodiment. Incidentally, the touchdown bearing 112 also includes a similar structure, and therefore only the touchdown bearing 110 will be described as an example.

As illustrated in FIG. 4, an inner ring (that may also be called "inner race") 113 is provided around the shaft 91 with a distance in between, and a plurality of balls 116 are so provided as to be in contact with an outer peripheral surface of the inner ring 113. Moreover, an outer ring (that may also be called "outer race") 114 is so provided on the outer side of the balls 116 as to be in contact with the balls 116. In other words, the balls 116 are so provided as to be sandwiched between the inner ring 113 and the outer ring 114 in the radial direction. Further, a solid lubricant 115 may be formed on the surface of each of the inner ring 113 and the outer ring 114.

The solid lubricant 115 may be formed of any of the Au plating layer, the Cu plating layer, and the Ni-containing plating layer. Note that the Ni-containing plating layer may be any of various plating layers as long as the plating layer is a metal plating layer containing Ni, and for example, may be a Ni plating layer, a NiP plating layer, or a NiB plating layer.

These metals may suppress corrosion because of possessing a resistance to fluorine gas. In addition, these metals may function as a lubricant to reduce friction of the inner ring 113 and the outer ring 114 with the balls 116 since these metals are soft. Oil is not usable as a lubricant for the touchdown bearings 110 and 112 used in the laser chamber 10 because electric discharge becomes unstable by generation of impurity of the laser gas or the laser light is absorbed. Therefore, soft metallic material is used to function as the solid lubricant 115, so that the soft metallic material acts as a substitute of a lubricant. Thus, it may be possible to reduce consumption of the touchdown bearings while suppressing generation of impurity gas in the laser gas.

Incidentally, it is sufficient for the solid lubricant 115 to cover only the outer peripheral surface of the inner ring 113 and an inner peripheral surface of the outer ring 114 that are in contact with the balls 116, in order that the solid lubricant 115 performs only a function as the lubricant, and thus such a configuration may be employed. In terms of suppressing corrosion by the fluorine gas, however, the solid lubricant 115 may be preferably formed on the entire surface of the inner ring 113 and the outer ring 114. Therefore, the solid lubricant 115 may be formed on the entire inner ring 113 and the entire outer ring 114.

The Au plating layer, the Cu plating layer, and the Ni-containing plating layer used for the solid lubricant 115 may be formed by plating literally. For example, the Au plating layer and the Cu plating layer may be formed by electroplating, and the Ni-containing plating layer may be formed by non-electrolytic plating. Sufficient adhesiveness is provided to the Ni-containing plating layer by the non-electrolytic plating, whereas sufficient adhesiveness may not be provided to the Au plating layer and the Cu plating layer in many cases unless the electric plating is performed. Therefore, a plating method suitable for each layer may be used.

The inner ring 113 and the outer ring 114 may be formed of, for example, stainless steel (SUS440C) except for the part of the solid lubricant 115. Stainless steel (SUS440C) does not necessarily possess high resistance to fluorine gas; however, when the solid lubricant 115 is provided on the surface, it may be possible to form the touchdown bearings 110 and 112 suitable for the laser chamber 10.

Moreover, each of the balls 116 may be formed of any of various materials depending on usage, and for example, each of the balls 116 may be a ceramic ball 116 formed of ceramics. A material of the ceramic ball 116 may be preferably alumina ceramics that is difficult to react with $F_2$ gas.

Incidentally, when the Au plating layer or the Cu plating layer is formed on the surface of each of the inner ring 113 and the outer ring 114 made of stainless steel (SUS440C), metal plating containing nickel of about 0.5 μm may be first performed by the non-electrolytic plating to form a base layer, and the Au plating layer or the Cu plating layer with a predetermined thickness may be further formed by the electric plating. As is typically known, performing such multilayer plating may improve adhesiveness of the plating layers. Note that the thickness of the Au plating layer or the Cu plating layer may be, for example, within a range from 2 μm to 13 μm both inclusive. Moreover, when the Au plating layer or the Cu plating layer is formed by the electric plating, the plating layer with a predetermined thickness may be formed by adjusting a current and an energization time.

As described above, the Ni-containing plating layer may be directly plated on the surface of stainless steel (SUS440C), and the thickness of the plating layer in this case may also be, for example, within a range from 2 μm to 13 μm both inclusive. Moreover, the Ni-containing plating layer may be formed by the non-electrolytic plating. For example, in the case of the NiP plating layer, the inner ring 113 and/or the outer ring 114 may be immersed in a plating bath including hypophosphorous acid as a reducing agent for a predetermined time to form a plating layer with a predetermined thickness, and in the case of the NiB plating layer, the inner ring 113 and/or the outer ring 114 may be immersed in a plating bath including diborane as a reducing agent for a predetermined time to form a plating layer with a predetermined thickness.

In this way, according to the laser chamber according to the embodiment 1 and the discharge excitation gas laser apparatus using the same, forming any covering layer of the Au plating layer, the Cu plating layer, and the Ni-containing plating layer on the surfaces of the touchdown bearings 110 and 112 makes it possible to suppress corrosion of the inner ring 113 and the outer ring 114, and to suppress consumption of the touchdown bearings 110 and 112 to allow the touchdown bearings 110 and 112 to perform bearing function smoothly for long periods.

4.2 Embodiment 2

Figure 5:
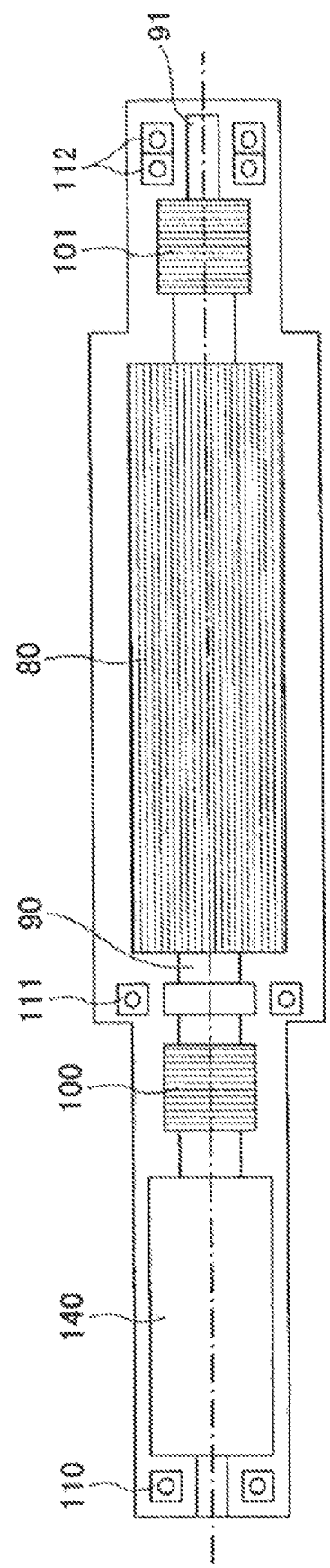
FIG. 5 is a diagram illustrating an example of a cross flow fan provided in a laser chamber and a driving mechanism thereof according to embodiment 2 of the disclosure.

FIG. 5 is a diagram illustrating an example of the cross flow fan 80 provided in a laser chamber according to embodiment 2 of the disclosure and a driving mechanism thereof. In the cross flow fan 80 and the driving mechanism of the embodiment 2, the motor 140 is coaxially connected to the cross flow fan 80. Also, a first touchdown bearing 110 is provided on the outside of the motor 140, the magnetic bearing 100 and a second touchdown bearing 111 are provided between the motor 140 and the cross flow fan 80, and the magnetic bearing 101 and a third touchdown bearing 112 are provided on the outside of the cross flow fan 80. Specifically, the embodiment 2 is different from the embodiment 1 provided with only two touchdown bearings 110 and 112, in that the three touchdown bearings 110, 111, and 112 are provided. In this way, the touchdown bearing 111 may be provided as well between the cross flow fan 80 and the motor 140 instead of providing the touchdown bearings 110 and 112 only on both outer ends of the entire configuration.

In FIG. 5, the first and third touchdown bearings 110 and 112 on both ends are for the thin shaft 91 and receive a small load. However, the second touchdown bearing 111 being for the thick shaft 90 receives a large load as is provided between the motor 140 as the driving source and the cross flow fan 80 as a driving target.

In the embodiment 1, the Au plating layer, the Cu plating layer, and the Ni-containing plating layer are exemplified as the plating layer to be the solid lubricant 115. Among them, the Au plating layer and the Cu plating layer are softer than the Ni-containing plating layer, and may be a plating layer that may withstand a relatively large load. Moreover, the Cu plating layer possesses reactivity with $F_2$ gas lower than that of the Au plating layer. Therefore, the Cu plating layer may be preferable as the solid lubricant of the touchdown bearing of the laser chamber that uses the laser gas containing the $F_2$ gas.

Accordingly, the Cu plating layer that may withstand a large load may be preferably used for the second touchdown bearing 111 between the motor 140 and the cross flow fan 80. For example, the thickness of the Cu plating layer used as the solid lubricant 115 of the second touchdown bearing 111 may be 10 μm.

However, the Cu plating layer is not high in processing accuracy (accuracy in film thickness control of the plating layer) and tolerance thereof is ±2 to 3 μm. Therefore, the thickness of the Cu plating layer used as the solid lubricant 115 in the second touchdown bearing 111 may be preferably 10±3 μm, and more preferably 10±2 μm.

On the other hand, the first and third touchdown bearings 110 and 112 on both outer ends receive a load smaller than that of the second touchdown bearing; however are small in size, and are demanded to be small intolerance of the plating layer.

Here, out of the Au plating layer, the Cu plating layer, and Ni-containing plating layer, the Ni-containing plating layer, in particular, the NiP plating layer is harder than the Cu plating layer but is small in tolerance, which makes it possible to be subjected to film thickness control with high accuracy. Specifically, when the film thickness of the solid lubricant 115 is set to 10 μm, the NiP plating layer is easily formed with the accuracy of 10±1 μm. Thus, the NiP plating layer may be used in the first and third touchdown bearings 110 and 112 that receive a load smaller than that of the second touchdown bearing but for which the film thickness control with higher accuracy is demanded.

Incidentally, basically, using the Cu plating layer that is soft and may withstand a large load, for the solid lubricant 115 used in the first and third touchdown bearings 110 and 112 is preferable similarly to the second touchdown bearing 111. Therefore, in the case where the demand for the processing accuracy of the first and third touchdown bearings 110 and 112 is not high or in the case where the film thickness control with high accuracy is possible even with use of the Cu plating layer, the Cu plating layer may be used as the solid lubricant 115 in all of the first to third touchdown bearings 110 to 112.

Table 1 illustrates the foregoing description in table.

TABLE 1

| | Position | | | | | |
|---|---|---|---|---|---|---|
| | First TDB | Second TDB | Third TDB | First TDB | Second TDB | Third TDB |
| Base Material | SUS 440C | | | SUS 440C | | |
| Material of Plating Surface Treatment | Cu | Cu | Cu | NiP | Cu | NiP |
| Plating Thickness | 10 μm | | | 10 μm | | |

In Table 1, the description on left side represents a case where the Cu plating layer is used as the solid lubricant 115 in all of the first to third touchdown bearings 110 to 112. The description on right side represents a case where the Cu plating layer is used as the solid lubricant 115 in the second touchdown bearing 111 and the NiP plating layer is used as the solid lubricant 115 in the first and third touchdown bearings 110 and 112.

In addition, although it is disadvantageous in cost, etc., the Au plating layer may be used in all of the first to third touchdown bearings 110 to 112, and materials of the plating layers used as the solid lubricant 115 may be variously combined depending on usage.

Moreover, the thickness of the solid lubricant 115 has been described by giving an example of 10 μm in the present embodiment; however, the thickness may be variously modified depending on usage. For example, an appropriate film thickness may be selected depending on usage within a range from 2 μm to 13 μm both inclusive.

Further, in the present embodiment, an example in which the touchdown bearings 110 to 112 are provided at three positions has been described; however, more touchdown bearings may be provided depending on usage, and plating layers suitable for respective positions may be each used as the solid lubricant 115 in consideration of the load size and the processing accuracy demanded for the respective provided positions.

In this way, in the laser chamber according to the embodiment 2 and the discharge excitation gas laser apparatus using the same, the touchdown bearings are provided at three or more positions, and the appropriate plating layer is used as the solid lubricant depending on the load and the processing accuracy of the provided positions. As a result, it is possible to suppress corrosion by fluorine gas and to effectively suppress consumption of the touchdown bearings.

5. Laser Chamber of Excimer Laser Apparatus 5.1 Embodiment 3

Figure 6:
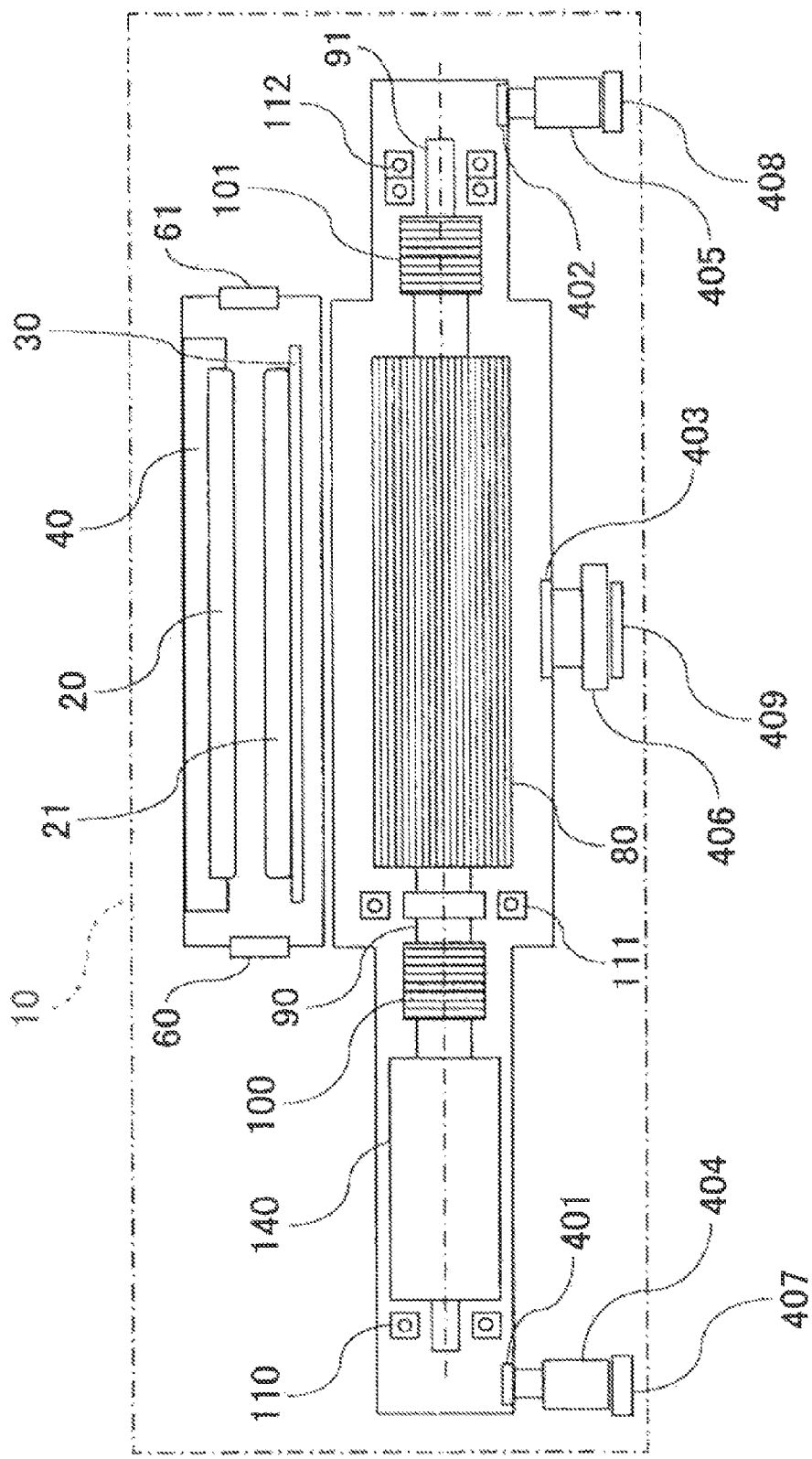
FIG. 6 is a diagram illustrating a configuration of a laser chamber of an excimer laser apparatus according to embodiment 3 of the disclosure.

FIG. 6 is a diagram illustrating a configuration of a laser chamber of an excimer laser apparatus according to embodiment 3 of the disclosure. The laser chamber 10 of the excimer laser as illustrated in FIG. 6 may include the pair of electrodes 20 and 21, the electrode holder 30, the electric insulating section 40, and two windows 60 and 61. The pair of electrodes 20 and 21, the electrode holder 30, the electric insulating section 40, and the two windows 60 and 61 as illustrated in FIG. 6 may be similar to those illustrated in FIG. 1.

The laser chamber 10 may further include the cross flow fan 80, the shafts 90 and 91, the magnetic bearings 100 and 101, the touchdown bearings 110, 111, and 112, and the motor 140. The cross flow fan 80, the shafts 90 and 91, the magnetic bearings 100 and 101, the touchdown bearings 110, 111, and 112, and the motor 140 as illustrated in FIG. 6 may be similar to those illustrated in FIG. 5.

The laser chamber 10 may further include two inlet ports 401 and 402 and one exhaust port 403. The inlet port 401 may be adapted to supply purge gas to the touchdown bearings 110 and 111. The inlet port 401 may be so configured as to be connected to a pipe that is adapted to supply the purge gas. The inlet port 401 may be so configured as to be connected to a fitting joint connected to the pipe that is adapted to supply the purge gas. The inlet port 401 may be provided on the touchdown bearing 110 on side opposite to the cross flow fan 80 (on the outside of the touchdown bearing 110) in a direction of the shaft 90. The inlet port 402 may be adapted to supply the purge gas to the touchdown bearing 112. The inlet port 402 may be so configured as to be connected to a pipe that is adapted to supply the purge gas. The inlet port 402 may be so configured as to be connected to a fitting joint connected to the pipe that is adapted to supply the purge gas. The inlet port 402 may be provided on the touchdown bearing 112 on side opposite to the cross flow fan 80 (on the outside of the touchdown bearing 112) in a direction of the shaft 91. The exhaust port 403 may be adapted to exhaust the purge gas that is supplied to the touchdown bearings 110, 111, and 112. The exhaust port 403 may be so configured as to be connected to a pipe that is adapted to exhaust the purge gas. The exhaust port 403 may be so configured as to be connected to a fitting joint connected to the pipe that is adapted to exhaust the purge gas. The exhaust port 403 may be provided between the touchdown bearings 111 and 112 in one or both directions of the shafts 90 and 91.

The laser chamber 10 may further include three fitting joints 404, 405, and 406. The fitting joint 404 may be connected to the inlet port 401. The fitting joint 405 may be connected to the inlet port 402. The fitting joint 406 may be connected to the inlet port 403. Each of the fitting joint 404 and the fitting joint 405 may be, for example, commercially-available VCR (registered trademark) metal gasket face seal fitting. The fitting joint 406 may be, for example, a quick coupling including an O-ring. The O-ring included in the quick coupling may be formed of a fluorine-containing resin.

The laser chamber 10 may further include three caps 407, 408, and 409. The cap 407 may be connected to the inlet port 401. The cap 407 may be connected to the fitting joint 404. The cap 407 may seal the inlet port 401 directly. The cap 407 may seal the inlet port 401 through the fitting joint 404. The cap 408 may be connected to the inlet port 402. The cap 408 may be connected to the fitting joint 405. The cap 408 may seal the inlet port 402 directly. The cap 408 may seal the inlet port 402 through the fitting joint 405. The cap 409 may be connected to the exhaust port 403. The cap 409 may be connected to the fitting joint 406. The cap 409 may seal the exhaust port 403 directly. The cap 409 may seal the exhaust port 403 through the fitting joint 406.

Figure 7A:
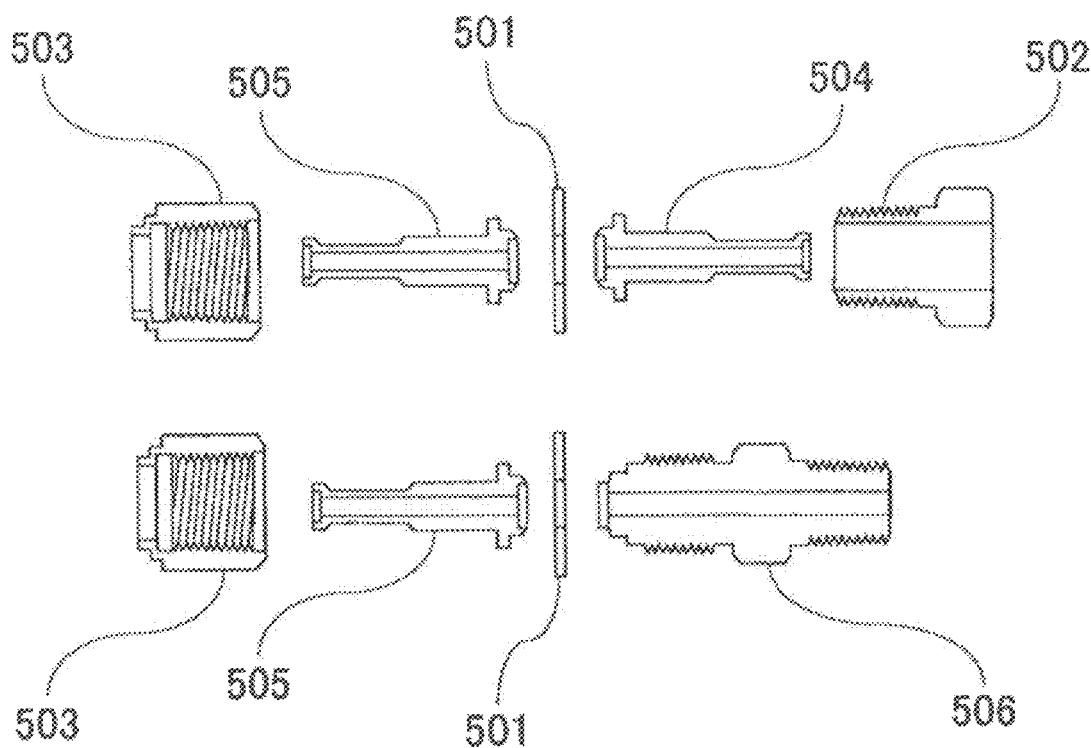
FIG. 7A is a diagram illustrating an example of VCR (registered trademark) metal gasket face seal fitting.

FIG. 7A is a diagram illustrating an example of VCR (registered trademark) metal gasket face seal fitting. VCR (registered trademark) metal gasket face seal fitting may include, for example, a combination of a male nut 502 and a female nut 503 to sandwich a gasket 501 between two glands 504 and 505. VCR (registered trademark) metal gasket face seal fitting may include, for example, a combination of a body 506 and the female nut 503 to sandwich the gasket 501 between the body 506 and the gland 505.

Figure 7B:
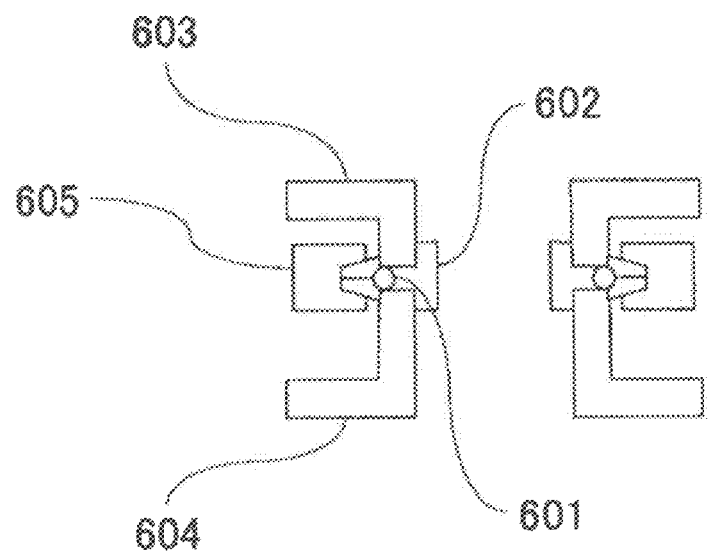
FIG. 7B is a diagram illustrating an example of a quick coupling.

FIG. 7B is a diagram illustrating an example of the quick coupling. The quick coupling may sandwich a center ring 602 provided with an O-ring 601 between two flanges 603 and 604 and may tighten the center ring 602 and the flanges 603 and 604 by a clamp 605.

Figure 8:
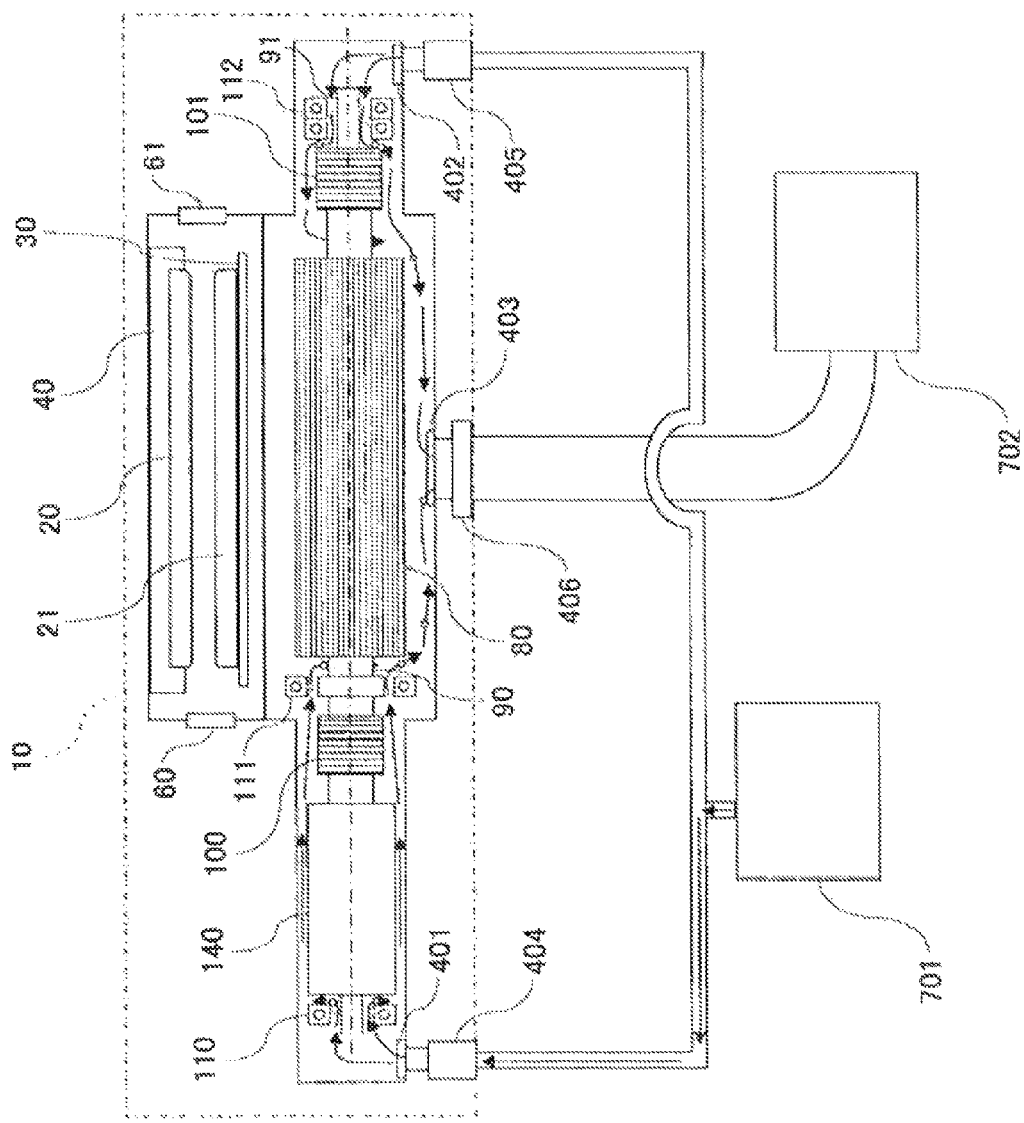
FIG. 8 is a diagram illustrating operation of the laser chamber of the excimer laser apparatus according to the embodiment 3 of the disclosure.

FIG. 8 is a diagram illustrating operation of the laser chamber of the excimer laser apparatus according to the embodiment 3 of the disclosure.

When the laser gas containing fluorine gas is supplied to the laser chamber 10 of the excimer laser and electric discharge is caused between the pair of electrodes 20 and 21, fluorine atoms may be generated from the laser gas. The fluorine atoms generated from the laser gas may react with the touchdown bearings 110, 111, and 112. When the touchdown bearings 110, 111, and 112 are each formed of stainless steel (SUS), fine particles of iron fluoride may be generated as dust particles. The dust particles generated on the touchdown bearings 110, 111, and 112 may absorb moisture in the air to swell when the laser chamber 10 is opened for maintenance of the laser chamber 10. The swollen dust particles may fill a clearance between the touchdown bearing 110 and the shaft 90, a clearance between the touchdown bearing 111 and the shaft 90, and a clearance between the touchdown bearing 112 and the shaft 91. The swollen dust particles may be deposited on the inner ring, the outer ring, and the surface of the bearing balls of the respective touchdown bearings 110, 111, and 112. As a result, lock of the touchdown bearings 110, 111, and 112 may occur.

When the laser chamber 10 according to the embodiment 3 of the disclosure includes the inlet port 401, a pipe may be directly connected to the inlet port 401. When the laser chamber 10 according to the embodiment 3 of the disclosure includes the inlet port 401, the pipe may be connected to the inlet port 401 through the fitting joint 404. When the pipe is connected to the inlet port 401 through the fitting joint 404, the pipe is allowed to be more easily connected to the inlet port 401. When the laser chamber 10 according to the embodiment 3 of the disclosure includes the inlet port 402, a pipe may be directly connected to the inlet port 402. When the laser chamber 10 according to the embodiment 3 of the disclosure includes the inlet port 402, the pipe may be connected to the inlet port 402 through the fitting joint 405. When the pipe is connected to the inlet port 402 through the fitting joint 405, the pipe is allowed to be more easily connected to the inlet port 402. The pipes connected to the inlet port 401 and the inlet port 402 may be connected to purge gas supplying unit 701. The purge gas supplying unit 701 may supply the purge gas to the inlet port 401 and the inlet port 402. The purge gas may be gas not containing both of moisture and impurity. The purge gas may be one or more of, for example, nitrogen ($N_2$) gas, helium (He) gas, carbon dioxide ($CO_2$) gas, and a combination thereof. The purge gas supplying unit 701 may be a tank storing liquid of the purge gas.

When the laser chamber 10 according to the embodiment 3 of the disclosure includes the exhaust port 403, a pipe may be directly connected to the exhaust port 403. When the laser chamber 10 according to the embodiment 3 of the disclosure includes the exhaust port 403, the pipe may be connected to the exhaust port 403 through the fitting joint 406. When the pipe is connected to the exhaust port 403 through the fitting joint 406, the pipe is allowed to be more easily connected to the exhaust port 403. The pipe connected to the exhaust port 403 may be connected to an exhaust unit 702. The exhaust unit 702 may exhaust the gas that is supplied from the inlet port 401 and the inlet port 402 to the inside of the laser chamber 10, to the outside of the laser chamber 10. The exhaust unit 702 may be a dry pump.

When the purge gas supplying unit 701 is connected to the inlet ports 401 and 402 and the exhaust unit 702 is connected to the exhaust port 403, it is possible to supply the purge gas into the laser chamber 10 and to exhaust the purge gas to the outside of the laser chamber 10. When the purge gas is supplied into the laser chamber 10 and the purge gas is exhausted to the outside of the laser chamber 10, the dust particles adhered to the touchdown bearings 110, 111, and 112 are allowed to be removed. The dust particles that have been removed from the touchdown bearings 110, 111, and 112 are allowed to be removed to the outside of the laser chamber 10 by the exhaust unit 702 through the exhaust port 403, together with the purge gas.

The dust particles adhered to the touchdown bearings 110, 111, and 112 may be removed by the purge gas before the laser chamber 10 is opened for maintenance of the laser chamber 10. In this case, the dust particles that may cause lock of the touchdown bearings 110, 111, and 112 are allowed to be removed in advance. Since occurrence of the lock of the touchdown bearings 110, 111, and 112 may be suppressed, frequency of replacement of the touchdown bearings 110, 111, and 112 is allowed to be reduced.

When the inlet ports 401 and 402 are provided on the outside of the touchdown bearings 110 and 111, respectively, and the exhaust port 403 is provided between the touchdown bearings 111 and 112, it is possible to more effectively flow the purge gas. As a result, the dust particles adhered to the touchdown bearings 110, 111, and 112 are allowed to be more effectively removed.

5.2 Embodiment 4

Figure 9:
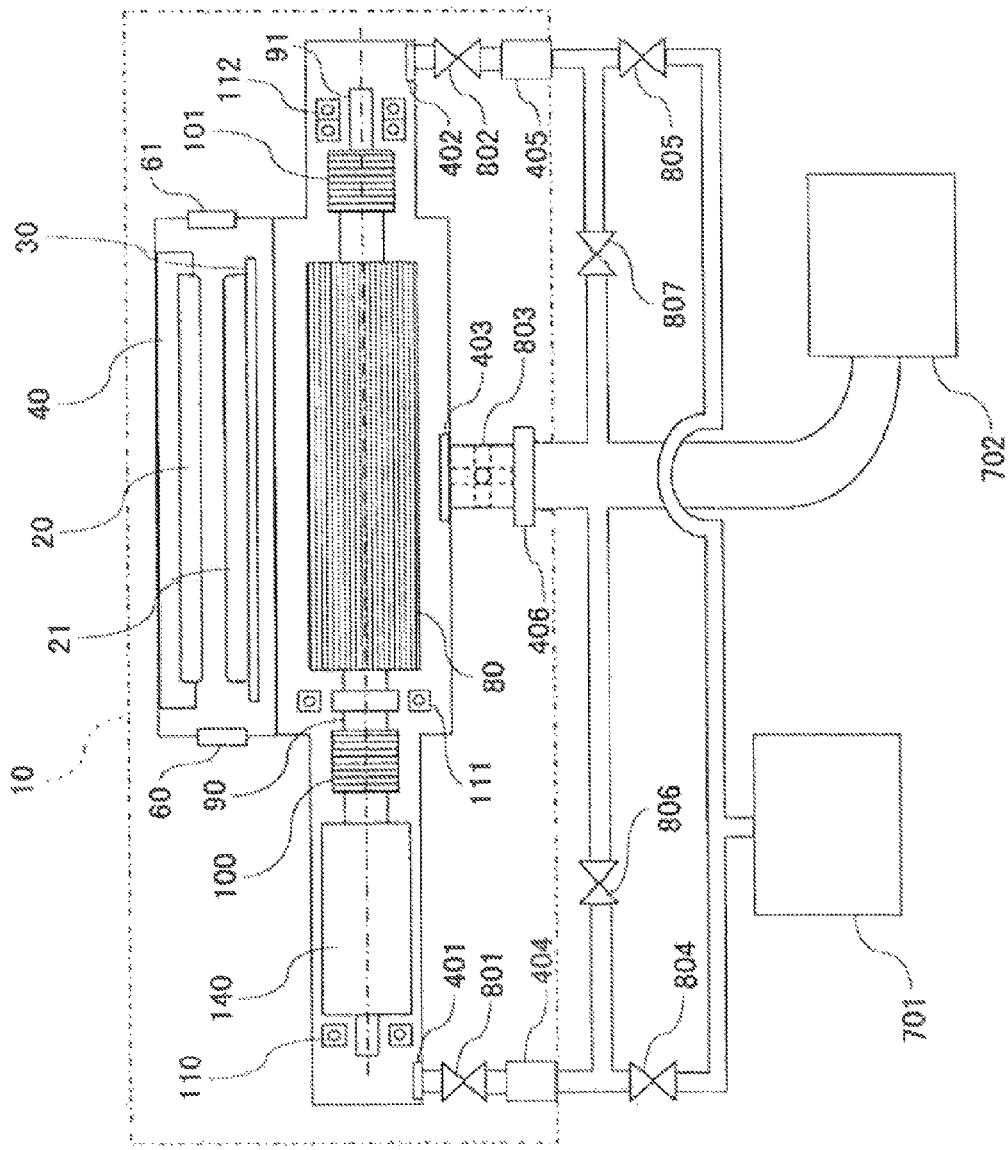
FIG. 9 is a diagram illustrating a configuration of a laser chamber of an excimer laser apparatus according to embodiment 4 of the disclosure.

FIG. 9 is a diagram illustrating a configuration of a laser chamber of an excimer laser apparatus according to embodiment 4 of the disclosure. The laser chamber 10 of the excimer laser as illustrated in FIG. 9 may include the pair of electrodes 20 and 21, the electrode holder 30, the electric insulating section 40, and the two windows 60 and 61. The pair of electrodes 20 and 21, the electrode holder 30, the electric insulating section 40, and the two windows 60 and 61 as illustrated in FIG. 9 may be similar to those illustrated in FIG. 6 and FIG. 8.

The laser chamber 10 may further include the cross flow fan 80, the shafts 90 and 91, the magnetic bearings 100 and 101, the touchdown bearings 110, 111, and 112, and the motor 140. The cross flow fan 80, the shafts 90 and 91, the magnetic bearings 100 and 101, the touchdown bearings 110, 111, and 112, and the motor 140 as illustrated in FIG. 9 may be similar to those illustrated in FIG. 6 and FIG. 8.

The laser chamber 10 may further include the inlet ports 401 and 402, the exhaust port 403, and the fitting joints 404, 405, and 406. The inlet ports 401 and 402, the exhaust port 403, and the fitting joints 404, 405, and 406 as illustrated in FIG. 9 may be similar to those illustrated in FIG. 6 and FIG. 8. A caliber of each of the inlet ports 401 and 402 may be smaller than a caliber of the exhaust port 403.

The laser chamber 10 as illustrated in FIG. 9 may further include three valves 801, 802, and 803. Each of the valves 801, 802, and 803 may be one or more of a bellows valve, a ball valve, a needle valve, a butterfly valve, and a gate valve, independently. The valves 801, 802, and 803 may be connected to the inlet port 401, the inlet port 402, and the exhaust port 403, respectively. When the valve 801 is used for the inlet port 401 with the caliber smaller than that of the exhaust port 403, the valve 801 may be one or more of a bellows valve, a ball valve, and a needle valve. When the valve 802 is used for the inlet 402 with the caliber smaller than that of the exhaust port 403, the valve 802 may be one or more of a bellows valve, a ball valve, and a needle valve. When the valve 803 is used for the exhaust port 403 with the caliber larger than those of the valves 801 and 802, the valve 803 may be, for example, one or both of a butterfly valve and a gate valve.

Figure 10:
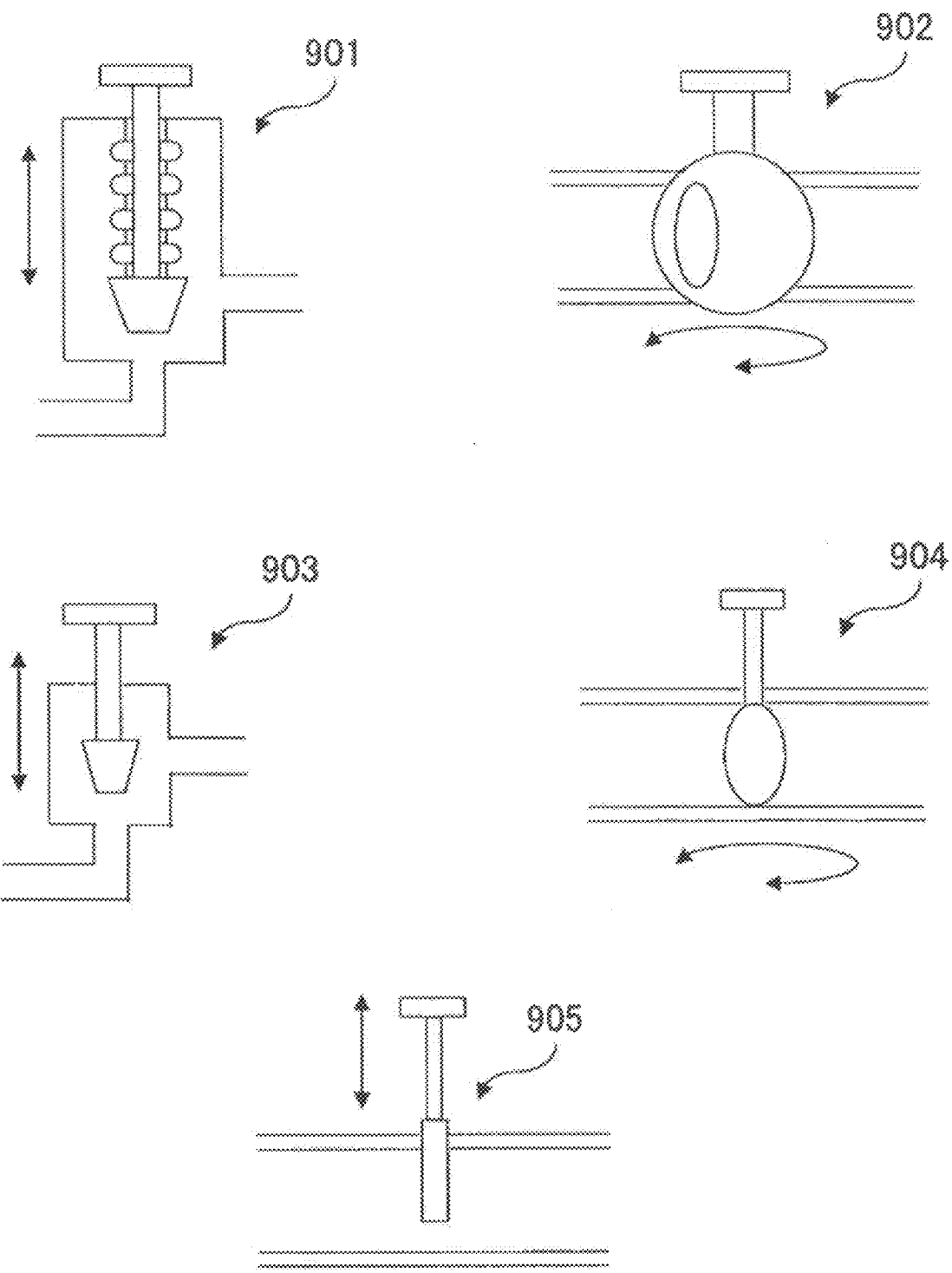
FIG. 10 is a diagram illustrating examples of valves.

FIG. 10 is a diagram illustrating examples of the valves. A bellows valve 901 may be a valve that presses a conical valve body provided at a front end of a valve shaft with a bellows part, against a valve seat surface provided in a valve box to stop flow of fluid. A ball valve 902 may be a valve that rotates a spherical valve body with a cavity to close or open a flow path. A needle valve 903 may be a valve that presses a conical valve body against a valve seat surface provided in a valve box to stop flow of fluid. A butterfly valve 904 may be a valve that rotates a disciform valve body to open or close a flow path. A gate valve 905 may be a valve that operates, substantially orthogonal to a flow path, a disciform valve body contained in a valve box of the valve to open or close the flow path.

The inlet port 401 and the valve 801 may be connected to the purge gas supplying unit 701 through the pipe and the valve 804. The inlet port 402 and the valve 802 may be connected to the purge gas supplying unit 701 through the pipe and the valve 805. The inlet port 401 and the valve 801 may be connected to the exhaust unit 702 through the pipe and the valve 806. The inlet port 402 and the valve 802 may be connected to the exhaust unit 702 through the pipe and the valve 807. The exhaust port 403 and the valve 803 may be connected to the exhaust unit 702 through the pipe. The purge gas supplying unit 701 and the exhaust unit 702 may be similar to those illustrated in FIG. 8.

The valve 801 may be connected to the valves 804 and 806 through the pipe. The valve 801 may be connected to the valves 804 and 806 through the fitting joint 404 and the pipe. The valve 802 may be connected to the valves 805 and 807 through the pipe. The valve 802 may be connected to the valves 805 and 807 through the fitting joint 405 and the pipe. The valve 803 may be connected to the exhaust unit 702 through the pipe. The valve 803 may be connected to the exhaust unit 702 through the fitting joint 406 and the pipe. When the valves 801, 802, and 803 are connected to the fitting joints 404, 405, and 406, respectively, the laser chamber 10 is allowed to be more easily connected to the purge gas supplying unit 701 and the exhaust unit 702.

In the laser chamber 10 as illustrated in FIG. 9, the air in the laser chamber 10 may be exhausted in advance by closing the valves 804 and 805 and opening the valves 801, 802, 803, 806, and 807. Since the air in the laser chamber 10 is allowed to be exhausted, it is possible to suppress occurrence of lock of the touchdown bearings 110, 111, and 112 that may be caused by moisture contained in the air. The purge gas may be supplied into the laser chamber 10 and the purge gas may be exhausted from the laser chamber 10 by closing the valves 806 and 807 and opening the valves 801, 802, 803, 804, and 805. It is possible to remove the dust particles adhered to the touchdown bearings 110, 111, and 112 from the touchdown bearings 110, 111, and 112 by the purge gas supplied to the laser chamber 10, and to remove the dust particles from the laser chamber 10 to the outside. It is possible to suppress occurrence of lock of the touchdown bearings 110, 111, and 112 that may be caused by the dust particles adhered to the touchdown bearings 110, 111, and 112.

In the laser chamber 10 as illustrated in FIG. 9, the fitting joint 406 is connected to the exhaust unit 702 without being connected to the purge gas supplying unit 701. Therefore, the fitting joint 406 may be not necessarily included in the laser chamber 10. It is considered that the amount of moisture in the air entering the laser chamber 10 through the exhaust port 403 is lower even when the fitting joint 406 is not included in the laser chamber 10. It is considered that lock of the touchdown bearings 110, 111, and 112 do not necessarily easily occur even when the fitting joint 406 is not included in the laser chamber 10.

Figure 11:
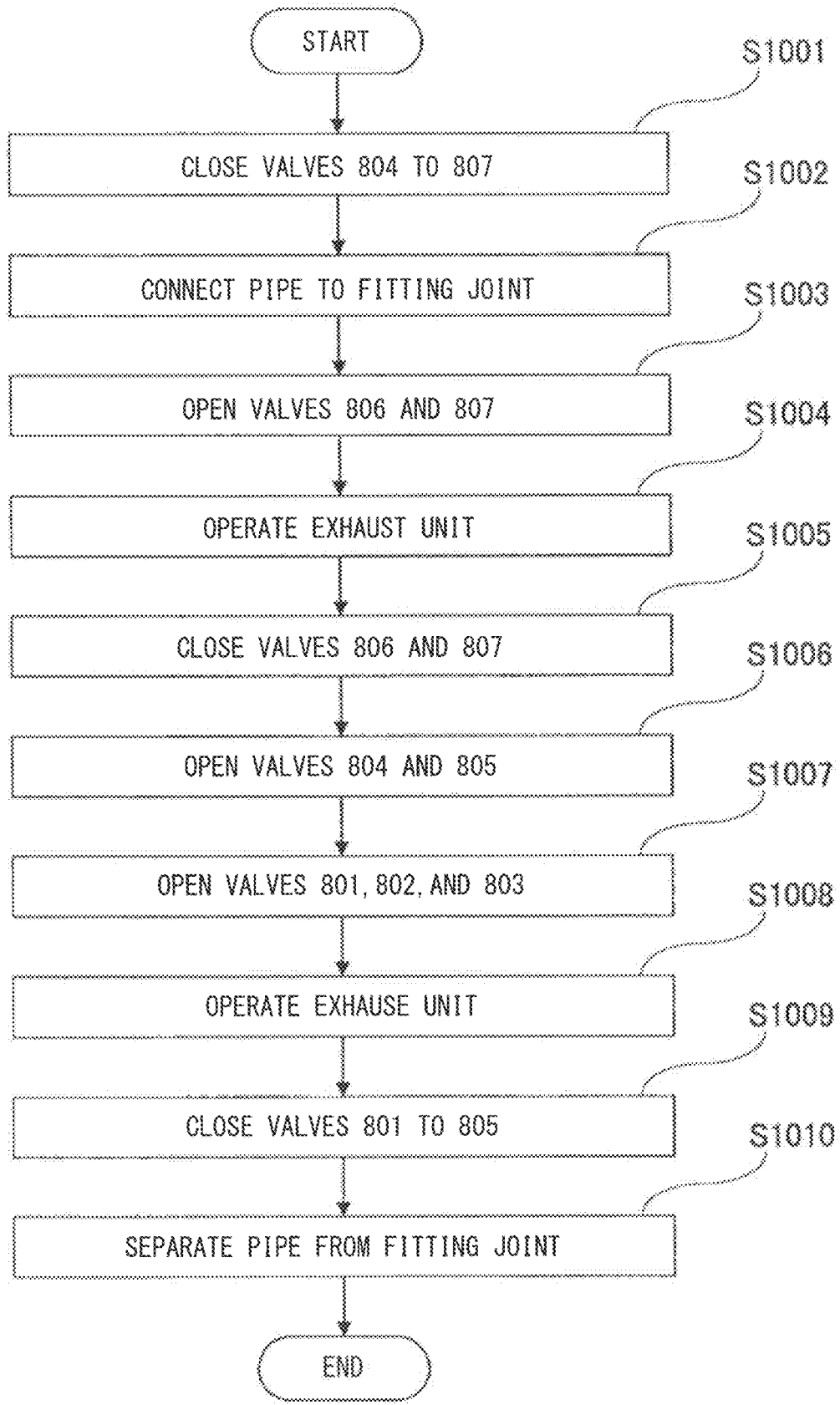
FIG. 11 is a diagram illustrating operation of the laser chamber of the excimer laser apparatus according to the embodiment 4 of the disclosure.

FIG. 11 is a diagram illustrating operation of the laser chamber of the excimer laser apparatus according to the embodiment 4 of the disclosure. FIG. 11 illustrates operation of the laser chamber 10 as illustrated in FIG. 9. In an initial state of the laser chamber 10, the valves 801, 802, and 803 may be closed. In the initial state of the laser chamber 10, the valves 804, 805, 806, and 807 may be opened.

At step S1001, the valves 804, 805, 806, and 807 may be closed.

At step S1002, the pipe connected to the purge gas supplying unit 701 and the exhaust unit 702 as illustrated in FIG. 9 may be connected to the fitting joints 404, 405, and 406 of the laser chamber 10.

At step S1003, the valves 806 and 807 may be opened.

At step S1004, the exhaust unit 702 may be operated. The air in the pipe may be exhausted through the valves 806 and 807 by the operation of the exhaust unit 702.

After the air in the pipe is exhausted, the valves 806 and 807 may be closed at step S1005. The operation of the exhausted unit 702 may be stopped.

At step S1006, the valves 804 and 805 may be opened.

At step S1007, the values 801, 802, and 803 may be opened.

At step S1008, the exhaust unit 702 may be operated. The purge gas may be supplied from the purge gas supplying unit 701 into the laser chamber 10 by the operation of the exhaust unit 702. The dust particles adhered to the touchdown bearings 110, 111, and 112 may be removed from the touchdown bearings 110, 111, and 112 by the supply of the purge gas from the purge gas supplying unit 701 into the laser chamber 10. The purge gas supplied to the laser chamber 10 may be exhausted together with the dust particles that have been removed from the touchdown bearings 110, 111, and 112, from the laser chamber 10 by the operation of the exhaust unit 702.

At step S1009, the valves 801, 802, 803, 804, and 805 may be closed. The operation of the exhaust unit 702 may be stopped.

At step S1010, the pipe connected to the purge gas supplying unit 701 and the exhaust unit 702 as illustrated in FIG. 9 may be separated from the fitting joints 404, 405, and 406.

In the disclosure, for example, one or more of the Au plating layer, the Ni-containing plating layer, and the Cu plating layer may be used for the touchdown bearings, and the inlet port to supply the purge gas to the touchdown bearings and the exhaust port to exhaust the purge gas may be provided. In this case, it is possible to suppress corrosion and consumption of the touchdown bearings, and to suppress occurrence of lock of the touchdown bearings. As a result, it is possible to reduce frequency of replacement of the touchdown bearings.

Hereinbefore, although the preferred embodiments of the disclosure have been described, the disclosure is not limited to the above-described embodiments, and various modifications and substitutions may be added to the above-described embodiments without departing from the scope of the disclosure.

The foregoing description is intended to be merely illustrative rather than limiting. It should therefore be appreciated that variations may be made in embodiments of the disclosure by persons skilled in the art without departing from the scope as defined by the appended claims. The terms used throughout the specification and the appended claims are to be construed as "open-ended" terms. For example, the term "includes/include/including" or "included" is to be construed as "including but not limited to". The term "has/have/having" is to be construed as "having but not limited to". Also, the indefinite article "a/an" described in the specification and recited in the appended claims is to be construed to mean "at least one" or "one or more".

This application claims the benefit of priority of the Japanese Patent Application No. 2012-243790 filed on Nov. 5, 2012, the entire contents of which are incorporated herein by reference.

REFERENCE SIGNS LIST

10 Laser chamber
20, 21 Electrode
80 Cross flow fan
90, 91 Shaft
100, 101 Magnetic bearing
110, 111, 112 Touchdown bearing
113 Inner ring
114 Outer ring
115 Solid lubricant
116 Ball
140 Motor
150 Magnetic bearing controller
160 Motor controller
240 Laser controller
401, 402 Inlet port
403 Exhaust port
404, 405, 406 Fitting joint
801, 802, 803 Valve

The invention claimed is:

1. A laser chamber housing a pair of discharge electrodes and a gas circulation fan, the laser chamber comprising:
a magnetic bearing configured to support a shaft of the gas circulation fan, with the shaft being in non-contact with the magnetic bearing; and
a touchdown bearing configured to operate as a bearing when the magnetic bearing is uncontrollable, the touchdown bearing being provided with solid lubricant configured of a Cu plating layer.

2. The laser chamber according to claim 1, wherein the solid lubricant covers at least a part of an inner ring and an outer ring of the touchdown bearing.

3. The laser chamber according to claim 1, wherein the solid lubricant covers an entire surface of an inner ring and an outer ring of the touchdown bearing.

4. The laser chamber according to claim 2, wherein a thickness of the solid lubricant is within a range from 2 μm to 13 μm both inclusive.

5. The laser chamber according to claim 2, wherein a Ni plating layer is formed as a base layer of the solid lubricant.

6. The laser chamber according to claim 2, wherein the touchdown bearing includes a ceramic ball between the inner ring and the outer ring.

7. The laser chamber according to claim 2, wherein the inner ring and the outer ring are each formed of a stainless steel material except for a part of the solid lubricant.

8. The laser chamber according to claim 1, further comprising
a motor coaxially connected with the fan, wherein
the touchdown bearing is provided at each of three positions, a connection point between the gas circulation fan and the motor, an outer end of the gas circulation fan, and an outer end of the motor.

9. The laser chamber according to claim 1, further comprising:
an inlet port configured to supply purge gas to the touchdown bearing; and
an exhaust port configured to exhaust the purge gas.

10. The laser chamber according to claim 9, further comprising:
a first fitting joint connected to the inlet port; and
a second fitting joint connected to the exhaust port.

11. The laser chamber according to claim 10, further comprising:
a first valve provided between the inlet port and the first fitting joint; and
a second valve provided between the exhaust port and the second fitting joint.

12. A discharge excitation gas laser apparatus comprising:
the laser chamber according to any one of claims 1 to 3, 4 to 8, and 9 to 11; and
a laser controller configured to control generation of laser in the laser chamber.

13. A laser chamber comprising:
a pair of electrodes;
a fan configured to circulate laser gas;
a magnetic bearing configured to magnetically support a shaft of the fan, with the shaft being in non-contact with the magnetic bearing;
a touchdown bearing configured to support the shaft of the fan when the magnetic bearing fails;
an inlet port configured to supply purge gas to the touchdown bearing; and
an exhaust port configured to exhaust the purge gas.

14. The laser chamber according to claim 13, further comprising:
a first fitting joint connected to the inlet port; and
a second fitting joint connected to the exhaust port.

15. The laser chamber according to claim 14, further comprising:
a first valve provided between the inlet port and the first fitting joint; and
a second valve provided between the exhaust port and the second fitting joint.

16. A discharge excitation gas laser apparatus comprising:
the laser chamber according to claim 13; and
a laser controller configured to control generation of laser light in the laser chamber.

* * * * *